United States Patent [19]

Czonka et al.

[11] 4,021,855

[45] May 3, 1977

[54] CASSETTE DETECTION DEVICE FOR RECORDING AND/OR PLAYBACK APPARATUS

[75] Inventors: Viktor Czonka; Alois Patlik, both of Vienna, Austria

[73] Assignee: U.S. Philips Corporation, New York, N.Y.

[22] Filed: July 7, 1975

[21] Appl. No.: 593,623

[30] Foreign Application Priority Data

July 17, 1974  Austria ............................. 5929/74

[52] U.S. Cl. ........................... 360/69; 200/DIG. 1; 335/205; 360/92
[51] Int. Cl.² .................. G11B 15/68; G11B 23/04; G11B 23/36
[58] Field of Search ............... 360/92, 69, 91, 105, 360/60; 200/DIG. 1; 335/304, 219, 229, 205

[56] References Cited
UNITED STATES PATENTS

| | | | |
|---|---|---|---|
| 3,178,685 | 4/1965 | Pettitt | 200/DIG. 1 |
| 3,254,313 | 5/1966 | Atkins et al. | 200/DIG. 1 |
| 3,317,212 | 5/1967 | Tatter et al. | 360/92 |
| 3,329,838 | 7/1967 | Myers | 200/DIG. 1 |
| 3,492,440 | 1/1970 | Cerbone et al. | 200/DIG. 1 |
| 3,548,138 | 12/1970 | Van Dine | 200/DIG. 1 |
| 3,691,490 | 9/1972 | Ragni | 335/205 |
| 3,766,327 | 10/1973 | Johnson et al. | 360/92 |
| 3,777,255 | 12/1973 | Young et al. | 335/205 |
| 3,825,949 | 7/1974 | Pyles | 360/92 |

*Primary Examiner*—Alfred H. Eddleman
*Attorney, Agent, or Firm*—Frank R. Trifari; David R. Treacy

[57] ABSTRACT

In a recording and/or playback apparatus for record carriers accommodated in cassettes, a detection device for determining the presence of a cassette in the apparatus in the correct position. The device comprises an electric circuit for controlling an apparatus function, in response to a sensing means formed by capacitive coupling between two spaced electrodes in the apparatus and an electrically conducting component in the cassette.

2 Claims, 3 Drawing Figures

CASSETTE DETECTION DEVICE FOR RECORDING AND/OR PLAYBACK APPARATUS

The invention relates to a recording and/or playback apparatus for record carriers accommodated in cassettes, which apparatus comprises a detection device for determining the presence of a cassette in the apparatus in the correct position at a predetermined location, at least one apparatus function being controlled depending on the presence of a cassette in said correct position. Such steps serve to ascertain whether at all a cassette is present in the apparatus at a predetermined location or whether at the predetermined location is in a specific position. Such a detection of the presence of a cassette in the correct position at a predetermined location is of importance in view of the correct operation of such an apparatus, i.e. both for an apparatus which always operates with one cassette at a time and for an apparatus which operates with several cassettes accommodated in a magazine, in which each time one of the cassettes is moved to a predetermined location with the magazine, from which it is subsequently transferred to an operating location in the apparatus itself, as is for example described in German Pat. Application, No. 2,009,868, which has been laid open for public inspection.

It is an object of the invention to provide a particularly simple and reliable detection device for for determining the presence of a cassette in the correct position at a predetermined location in the apparatus. The apparatus according to the invention is characterized in that the detection device comprises an electrically active sensing means for field-coupling between said means and at least one field-producing component of a cassette, which is included in an electric switching circuit which controls the apparatus function. Thus, without a cassette being touched by any means whatsoever, the presence of the cassette in the correct position at a predetermined location is ascertained, which is thus effected very reliably and disturbance-free.

It has been found to be very favourable when the field-coupling is constituted by a capacitive coupling between the sensing means, which comprises at least two spaced electrodes, and at least one electrically conducting component of a cassette. In this case the electric circuit which includes the sensing means may be designed so that a particularly simple and reliable operation is obtained; moreover, when cassettes which accommodate magnetizable record carriers are employed, there is no risk of the record carrier or the sensing means co-operating therewith, which take the form of magnetic heads, being adversely affected.

Furthermore, the invention relates to a cassette for an apparatus according to the invention as described hereinbefore. According to the invention such a cassette comprises at least one additional field-producing component. Thus, depending on the choice of the additional component, such as for example a permanent magnet, an electrically conducting foil etc., the type of field-coupling of the detection device which is used may be chosen arbitrarily and only one specific position or two/specific positions of the cassette may be identified by correspondingly arranging the additional component on the cassette. However, according to the invention it is of course also possible to determine the presence in the correct position of cassettes, known per se, if such cassettes already comprise a field-producing component.

The invention will be described in more detail hereinafter with reference to the accompanying drawings, which show some embodiments of the invention, to which the invention is not limited.

Figure 1:
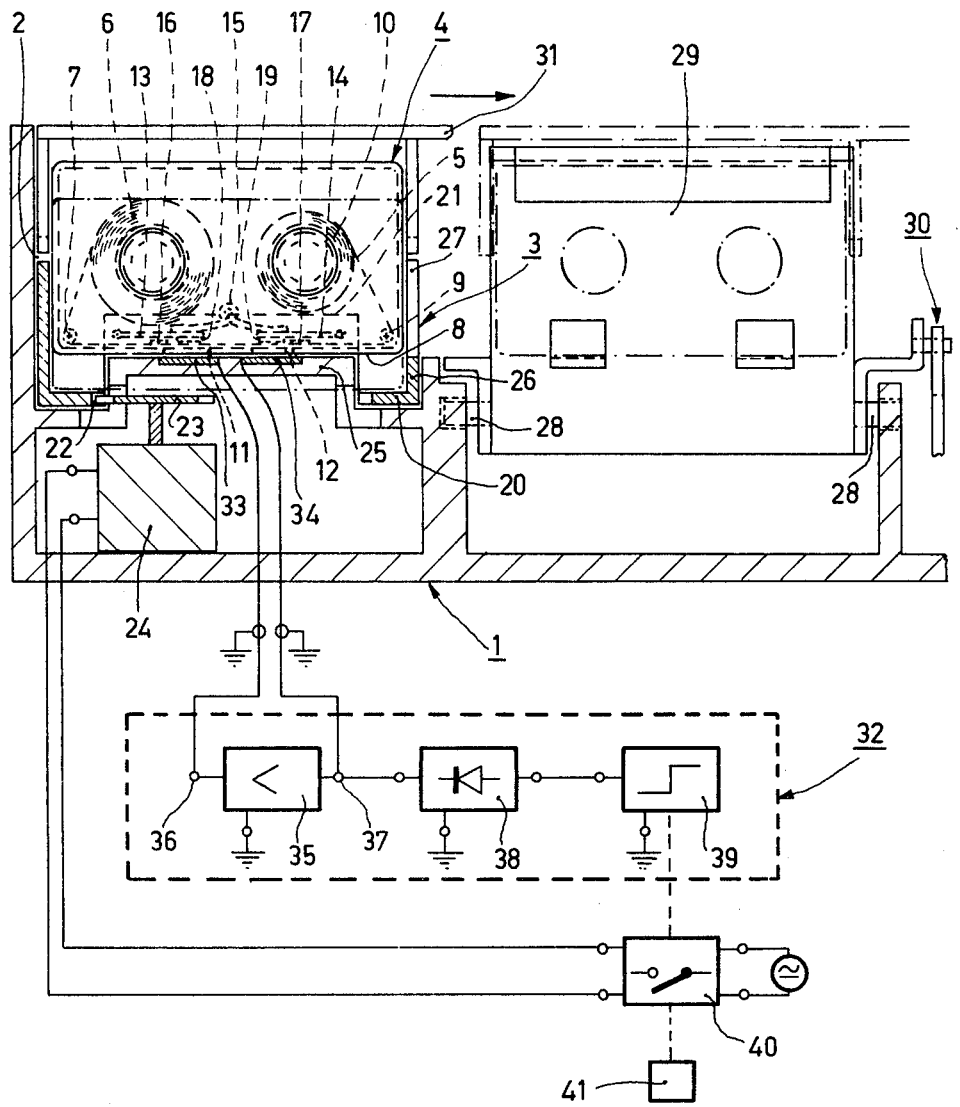
FIG. 1 shows an apparatus in which the detection device employs a field-coupling which is constituted by a capacitive coupling, the sensing means being formed by the two electrodes. In the apparatus of FIG. 2 a magnetic coupling is used as field-coupling and a magnetically controllable switch is employed as a sensing means.

In FIG. 1 the reference numeral 1 denotes a recording and/or playback apparatus, which comprises a channel 2, in which a magazine 3 can be placed, into which cassettes 4 can be inserted in separate compartments thereof. Each of the cassettes contains a record carrier 5, in the present case a magnetic tape, which from a tape reel 6 is fed over a tape guide 7 along a narrow side 8 of the cassette and a further tape guide 9 to a second tape reel 10. In the narrow side 8 of the cassette openings 11 and 12 are formed, which serve for the passage of scanning elements for the record carrier, which elements take the form of magnetic heads, when such a cassette is located in an operating position in the apparatus. Between the record carrier 5, which is passed along the narrow side 8 of the cassette, and one of the two tape reels 6 and 10 respectively a pivotable arm 13 and 14 respectively is disposed, on which a spring 15 acts, which is common for the two arms, which spring positions the arms against stops 16 and 17 respectively. At their free ends which face the record carrier the arms comprise pressure pads 18 and 19 respectively, which under the influence of the spring 15 effectively press the record carrier 5 against the scanning elements when said scanning elements penetrate the openings 11 and 12 respectively. The arms themselves are made of an electrically conducting material, for example a metal.

In the bottom section 20 of the magazine 3 a recess 21 is formed through which the cassettes 4 which are inserted in the compartments are accessible. Furthermore, teeth 22 are formed at the bottom section 20, with which a gear wheel 23 in the apparatus engages, which gear wheel can be driven by a motor 24, so that the magazine 3 can be moved in the channel 2. At a predetermined location of the channel 2 a ramp 25 is formed, which projects in the recess 21 of the magazine, so that in the magazine the cassettes near said ramp are lifted and the cassette which is at the highest point of the ramp is aligned in front of a slot 27 formed in the magazine wall 26 for each compartment. In FIG. 1 a cassette 4 which is thus lifted is indicated by uninterrupted lines; the positions of the cassettes which are not lifted are denoted by dash-dot lines. By switching on the motor 24 the cassettes contained in the magazine can be brought into said lifted position, in which position such a cassette is then at a feed-in location, from which it can be transferred to an operating location in the apparatus. For this purpose a tunnel-shaped cassette container 29 is provided in the apparatus which is pivotable about a journal 28, which container can be moved between a loading position and an operating position with the aid of a lever system 30, not shown. In the loading position shown in FIG. 1 the opening of the cassette container 29 is in line with the cassette 4 which is at the feed-in location, from which location it can be slid into the cassette container with the aid of a gripper 31; the position of the cassette and gripper thus obtained is indicated by dash-dot lines in FIG. 1. The cassette container with the cassette inserted therein can then be tilted. to said operating location at which as previously stated, the scanning elements and drive means, not shown, can co-operate with the record carrier in the cassette. Returning a cassette into the magazine is effected in a similar manner.

In the operating position a cassette 4 must be in a specific position in order that in particular the scanning elements can pass through the openings 11 and 12. However, as a result of this the individual cassettes should already occupy a specific position in the magazine, and in the present case such a position that the narrow side 8 of the cassette with the openings 11 and 12 faces the ramp 25. If the cassette were not in this position, this would result in failure of an apparatus function, because in the operating position of such a cassette the scanning elements could not co-operate with the record carrier. Therefore it is important to ascertain that the cassettes have been inserted in the compartments of the magazine in the correct position. Furthermore, it is of importance to ascertain whether a compartment of the magazine contains a cassette at all. When an empty compartment of the magazine reaches the feed-in location, a switching command should be given to the apparatus, in order that another compartment is found which does contain a cassette; this is effected by switching on the motor 24, so that the magazine is advanced accordingly.

To ascertain the presence of a correctly inserted cassette at the feed-in location a detection device is provided, which comprises an electrically active sensing means which is included in an electric circuit 32, which controls a corresponding apparatus function. The sensing means then forms a field-coupling between said means and field-producing components of the cassette. In the present embodiment the sensing means consists of two electrodes 33 and 34, which are disposed on the ramp 25 with a mutual spacing within the area of the feed-in location of a cassette. As field-producing components of the cassette metal arms 13 and 14 are used and the spring 15 which co-operates with them. In the present case the field-coupling consists of a capacitive coupling, which is formed by the series connection of two capacitances, namely the capacitance between the electrode 33 and the arm 13 and between the arm 14 and the electrode 34, which parts are disposed directly opposite each other, when a cassette is situated in the correct position at the feed-in location. Hence, when a cassette is present at the feed-in location in the correct position, the capacitance between the electrodes 33 and 34 is higher than when there is no cassette at the feed-in location, or when a cassette at the feed-in location is in the wrong position, its narrow side 8 facing away from the ramp 25.

The switching circuit 32 comprises an amplifier 35, whose input 36 is connected to the electrode 33 and whose output 37 is connected to the electrode 34, so that via the capacitance which exists between the electrodes a feedback is obtained between the output and the input of the amplifier, which at a suitable degree of feedback causes the amplifier to to oscillate. To the output 37 of the amplifier a rectifier circuit 38 is connected, which when the amplifier 35 oscillates supplies an output signal, which is applied to a Schmitt trigger 39, which then releases the actual switching function in the apparatus. In the present case the Schmitt trigger controls a switching stage 40, which is included in the supply circuit for the motor 24. By means of said switching stage it is for example possible to energize the motor 24 upon actuation of a control 41, so that the magazine transport and thus a change of the cassette at the feed-in location is started. The gain of the amplifier 35 has been adjusted so that when a cassette is not in the correct position at the feed-in location the amplifier just does not oscillate owing to the low capacitance between the electrodes 33 and 34. In this case the Schmitt trigger 39 does not respond, so that the switching stage 40 is not influenced and magazine transport, if in progress, is contained. However, when a cassette is in the correct position at the feed-in location, the amplifier will oscillate owing to the higher capacitance existing between the electrodes 33 and 34, so that the Schmitt trigger 39 is activated, which in its turn influences the switching stage 40 and thus the magazine transport, said transport being discontinued, if in progress.

This ensures that in the case of a cassette change at the feed-in location, when the magazine compartment which is now at the feed-in location, does not contain a cassette or contains an incorrectly inserted cassette, so that as stated the narrow side 8 with the openings 11 and 12 faces away from the ramp 25, the motor 24 which has been switched on with the control 41 remains energized until a compartment with a correctly inserted cassette has reached the feed-in location, after which the cassette which is now at the feed-in location can be transferred to the cassette container and thus to the apparatus. In the present embodiment a cassette which has been inserted incorrectly in the magazine has the same effect as the absence of a cassette. The apparatus function which is controlled by the switching circuit, as described previously, consists in that the magazine transport is continued until a correctly inserted cassette is located at the feed-in location. Such a perfect operation of a function is of special importance in the case of automatic changing of cassettes, as frequently employed in apparatus of this type used in dictation systems. However, it is obvious that with the detection device described, depending on the selected mode of operation of the switching stage 40 or the switching circuiy 32, also other apparatus functions may be controlled; for example, the magazine transport may also be controlled so that from a number of preselected cassettes of one magazine one reaches the feed-in location in the correct position, as is the case in particular with apparatuses of this type which take the form of automatic music playback equipment.

As can be seen from the above, the detection device, because of the field-coupling principle which is used, senses the presence of a cassette in the correct position at the feed-in location without any contact, so that the cassette transport is not disturbed and absolute operational reliability is guaranteed. In the present embodiment no additional field-producing components are needed in the cassette, because the field-producing components already present in the cassette are used for the field-coupling.

Figure 2:
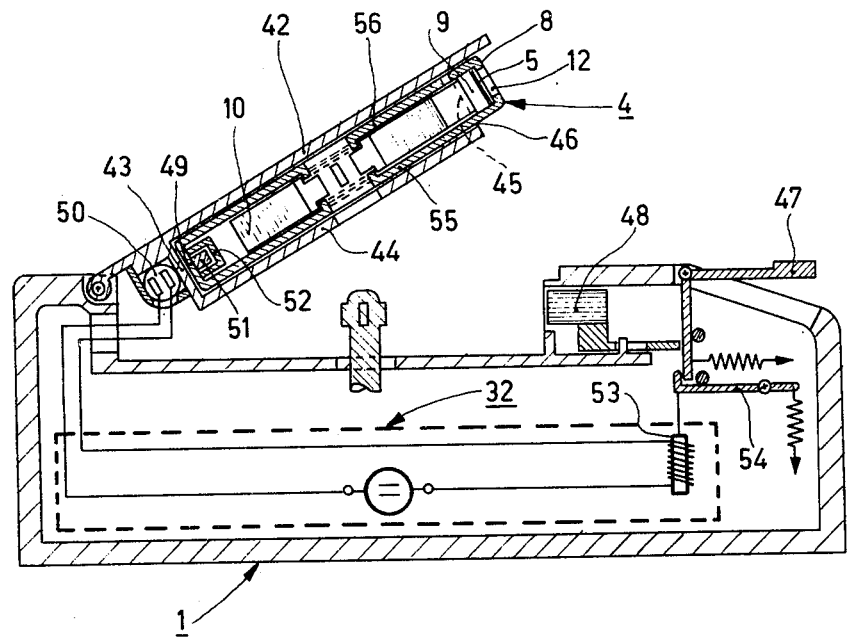

FIG. 2 shows an apparatus which comprises a flap 42 which is hinged thereto, which by the provision of further walls 43, 44 and 45 takes the form of a tunnel-shaped cassette container. When the flap is hinged way from the apparatus, a cassette 4 can be inserted, which can then be moved to its operating position by swinging the flap towards the apparatus. The cassette should then be inserted into the flap in such a way that the narrow side 8 of the cassette with the openings 11, 12 is located at the open end 46 of the cassette container. When a cassette is at its operating location, the scanning elements 48 for the record carrier can be made to co-operate with said carrier by actuation of a button 47, the scanning elements being moved towards the cassette and penetrating said cassette through the corresponding openings 11, 12. In this case it is also of importance that the cassette is in the above-mentioned position in the cassette container, so as to ensure that at the operating location of the cassette the scanning elements can enter the openings 11 and 12 respectively. When for example the cassette would be inserted so that its narrow side 49 would be located at the open end 46 of the cassette container, the scanning elements 48 would not penetrate the cassette upon actuation of the button 47, with a consequent risk of damage to the scanning elements.

In the present embodiment it is therefore necessary to determine the presence in the correct position of a cassette in the cassette container. The detection device provided for this purpose comprises a magnetically controllable switch 50, a so-called reed-contact. This a sensing means, which under the influence of an external magnetic field forms a conducting connection, employs a magnetic coupling as field-coupling. The switch 50 is disposed at the outside of the wall 43 of the cassette container which faces the open end 46. As field-producing component of the cassette, in addition to the other components of the cassette, a permanent magnet 51 is mounted on the inner surface of the cassette wall 49, which magnet is magnetized in the longitudinal direction of the cassette wall and which inside the cassette is surrounded by a magnetically-active screening jacket 52, in order to prevent a magnetisable record carrier from being adversely influenced, when such a carrier is used. The electric switching circuit 32 simply comprises an electromagnet 53, whose circuit includes the switch 50 which forms the the sensing means. The electromagnet 53 actuates a catch 54, which when the electromagnet is not energized blocks the button 47.

When a cassette has been inserted correctly in the cassette container, the permanent magnet 51 directly adjoins the switch 50, so that its contacts are closed under the influence of the magnetic field of the permanent magnet. Thus, the circuit for the electromagnet 53 is closed and consequently said magnet is energized and the catch 54 is removed from the actuation path of the button 47, so that the button 47 can be actuated and when the cassette is at the operating location the scanning elements 48 can be made to co-operate with the record carrier. However, when the cassette has been inserted incorrectly in the cassette container, the permanent magnet 51 will be located at the open end 46 of the cassette container. In that case there will be no field-coupling between the permanent magnet 51 and the switch 50, which is remote from it, so that said switch remains open. Thus, the electromagnet 53 is not energized and the catch 54 blocks the button 47. In this manner, the apparatus can operate only in the case of a correct position of the cassette in the cassette container.

It is effective to arrange the center of the permanent magnet 51 substantially in the plane of symmetry of the cassette, which is perpendicular to the narrow sides 8 and 49 and to the major surfaces 55 and 56 of the cassette. In that case the detection device is also operative when a cassette is inserted into the cassette container with its major surfaces reversed, which is of importance for cassettes in which the record carrier can be scanned in two directions in different tracks. However, when a cassette is adapted for one correct position only, the field-producing component of the cassette should be disposed correspondingly asymmetrically relative to the above-mentioned plane of symmetry.

Figure 3:
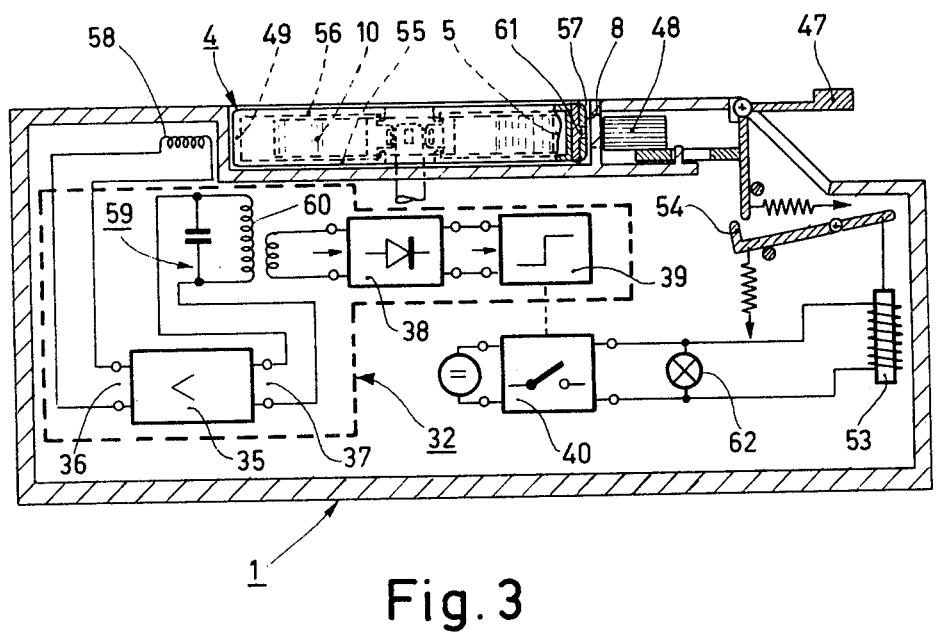
FIG. 3 shows an apparatus in which an electro-magnetic coupling is used for field-coupling and an inductive coil is used as sensing means.

In the embodiment of FIG. 3 a cassette 4 can be inserted directly by hand into a recess 57 formed in the apparatus. Also in this case, care must be taken that the position of the cassette is correct, in order that the scanning elements 48 can co-operate with the record carrier. In the case of an incorrect position of the cassette in the apparatus, in a similar way as in the embodiment of FIG. 2, a catch 54 which is movable by means of an electro-magnet 53 prevents actuation of the button 47, by means of which the scanning elements 48 can be moved.

The electrically active sensing means of the detection device now consists of a coil 58, which in the case of a correct position of the cassette in the apparatus is disposed near the cassette wall 49 without openings, with the coil axis perpendicular to said wall, outside the recess 57. The switching circuit 32, as in the embodiment of FIG. 1, comprises an amplifier 35 followed by a rectifier 38 and a Schmitt-trigger 39. The feedback of the amplifier 35, however, is now applied via a tuned circuit 59, which is connected to the amplifier output 37, the coil 60 of said tuned circuit being coupled to the coil 58, which is conncted to the input 36 of the amplifier 35 and functions as sensing means. In the case of a correct position of the cassette in the apparatus, the coil 60 is then disposed outside the recess 57 near the cassette wall 49, which has no openings, with the coil axis perpendicular to the major surfaces 55, 56 of the cassette. In the present embodiment an electromagnetic coupling is used as field-coupling; i.e., the coupling between the coil 60 of the tuned circuit 59 and the coil 58 is influenced. As field-producing component of the cassette, the cassette comprises a T-shaped angular element 61 of a ferromagnetic material as an additional component, whose mutually perpendicular sections are each oriented in the direction of the axes of the coils 58 and 60 respectively.

In the case of a correct position of the cassette in the apparatus the element 61 is outside the range of the coils 58 and 60. The coupling between the tuned circuit 59 and the coil 58 is then such that the amplifier 35 does not oscillate, so that the rectifier circuit 38 supplies no signal to the Schmitt trigger 39 and said trigger circuit supplies no switching command to the switching stage 40, so that electro-magnet 53 connected thereto is not energized and the button 47 is unlocked. When the cassette is incorrectly inserted in the recess 57, the element 61 will be situated near the coils 58 and 60, so that one of its two angular sections constitutes a connection path for a field concentration between the two coils 58 and 60, thus increasing the electro-magnetic coupling between the tuned circuit 59 and the coil 58, so that the amplifier 35 begins to oscillate. The rectifier circuit 38 then supplies an output signal which activates the Schmitt trigger 39, which in its turn actuates the switching stage 40, which stage energizes the electromagnet 53, so that said magnet actuates the catch 54, as a result of which the button 47 is blocked. By means of a pilot lamp 62 which is moreover connected to the switching stage 40 incorrect insertion of the cassette is optically signalled by said lamp lighting up.

It is obvious that a series of modifications to the embodiments described hereinbefore are possible, without departing from the scope of the invention. This applies in particular to the design of the electric switching circuit and the sort of apparatus function to be controlled thereby; for example, the switching circuit can also detect a frequency variation of an oscillation, which occurs owing to a variation of a frequency-determining element as a result of the field coupling of the sensing means with the field-producing component in the cassette. Furthermore, when a capacitive coupling is used as field coupling, for example a metallic foil may be disposed in the cassette as field-producing component of the cassette or an electrode of the sensing means may be constituted by the electrically conducting chassis of the apparatus, or the sensing means for the formation of different capacitances may comprise more than two electrodes. Finally, it is to be noted that a field-producing component in general is to be understood to mean components which either enable concentrated fields to be formed, such as the metallic arms in the embodiment of FIG. 1, or which by themselves produce concentrated fields, such as the permanent magnet used in the embodiment of FIG. 2.

What is claimed is:

1. In a recording and/or playback apparatus for record carriers accommodated in cassettes, an improved detection device for determining the presence of a cassette in the apparatus in the correct position in a predetermined location such that an apparatus function can be controlled in resonse to such presence, said device comprising electric circuit means for controlling a function of an apparatus in response to presence of a given capacitance between first and second input connections, and capacitive sensing means for applying said given capacitance between said input connections in response to presence of a cassette in a predetermined location, said sensing means comprising first and second electrodes connected respectively to said first and second input connections, and a cassette comprising an electrically conducting component arranged interiorally of the cassette, said conducting component and said electrodes arranged such that, said cassette being in said predetermined location, effective series capacitance between said first electrode and said electrically conducting component and between said conducting component and said second electrode is at least equal to said given capacitance.

2. A device as claimed in claim 1, wherein said electric circuit means comprises an amplifier having an input and an output, said first input connection being connected to said amplifier input and said second input connection being connected to said amplifier output, said amplifier being stable in the absence of application of said given capacitance, and said amplifier oscillating in response to connection of said given capacitance between said first and second input connections.

* * * * *